United States Patent [19]

Rothbart et al.

[11] 4,424,535
[45] Jan. 3, 1984

[54] DOCUMENT VIDEO DIGITIZER

[75] Inventors: Michael Rothbart, Westlake Village; Robert D. Therien, Newbury Park; Thomas W. Oliver, Agoura; Thomas W. Roller, Thousand Oaks; Robert D. Williams, Canoga Park, all of Calif.

[73] Assignee: Terminal Data Corporation, Woodland Hills, Calif.

[21] Appl. No.: 360,021

[22] Filed: Mar. 19, 1982

[51] Int. Cl.³ .............................................. H04N 1/12
[52] U.S. Cl. ................................... 358/294; 358/102; 358/285; 358/293
[58] Field of Search ................. 358/93, 108, 102, 285, 358/293, 294

[56] References Cited

U.S. PATENT DOCUMENTS

| 3,677,159 | 7/1972 | Studley | 352/121 |
| 3,988,062 | 10/1976 | Burton | 355/23 |
| 4,027,870 | 6/1977 | Frech | 271/65 |

OTHER PUBLICATIONS

Terminal Data Corporation "VS2200 Video Scan Camera."
Docuscan Software Documentation, Terminal Data Corp., Document No. 904030, May 1981.

Primary Examiner—Howard Britton
Attorney, Agent, or Firm—Harry R. Lubcke

[57] ABSTRACT

A high speed document manipulator providing high resolution digital video-signal output. A document transport moves the documents at a high speed for entrance, flip-over and exit, and at about one-fifth that speed for video scanning while moving for producing the video signal. Servo control provides a forward and back initial motion to obtain top to bottom scanning. The servo circuit is electrically protected. The video sensor is firmly coupled to the optical system. An elongated light source, elliptical reflector and "cool" mirror provide an elongated transverse illuminated area on the document as it moves through.

10 Claims, 5 Drawing Figures

DOCUMENT VIDEO DIGITIZER

BACKGROUND OF THE INVENTION

This invention pertains to producing digitized video signals from documents.

U.S. Pat. No. 3,988,062 discloses a photographic microfilm or microfiche document recorder that automatically moves documents for photographing and selectively may turn them over for copying both sides.

Non-responsive logic is employed. A state-counter determines the steps in the operation of the machine. Magnetically actuated clutches and brakes control the motions of belts that carry the documents.

U.S. Pat. No. 4,027,870 discloses a modification of the structure of the above patent in which the turn-over mechanism is at right angles to the main translation path of the documents. The documents are turned end-for-end rather than side for side. Clutches and brakes are used.

U.S. Pat. No. 3,677,159 discloses a photographic microfilm camera that employs a servo system loop to control film motion in combination with a pair of idler arms. A digital control circuit reduces the velocity of the film in steps for decelerating the film.

The digital circuit has nothing to do with digitizing video signals.

SUMMARY OF THE INVENTION

A microprocessor controls a servo system to move each document so that a digital video signal is produced according to the writings upon the document.

A desirably high throughput of 3,000 document images per hour is attained by utilizing a high speed for moving the documents and a slow speed for video scanning the same.

The document is moved forward from the loading position at a high speed to beyond the video scanning area, is stopped, and then moved backward at low speed for video scanning.

Then the document may be continued backward to the flip-over device, emerging therefrom moving forward at high speed until it reaches the video scanning area, after which it moves further forward at low speed for video scanning the second side of the document. Thereafter, it moves still further forward at high speed to exit the apparatus as a whole.

The microprocessor control can be altered by the operator to accomplish the above manipulation, except that the document moves exclusively at high speed after leaving the flip-over device and the second side of the document, if any, is not scanned.

Further, the microprocessor control can be altered to scan one side of the document and then exit it without flip-over.

The power amplifier of the servo system is protected by a diode to prevent catastrophic burn-out thereof upon a power semiconductor means thereof failing.

The power amplifier of the servo system is operated at a low dissipation loss by a plural diode clamp circuit there connected.

A document skew detection sensor coacts with the microprocessor to provide dynamic skew detection.

DESCRIPTION OF THE PREFERRED EMBODIMENTS

Figure 1:
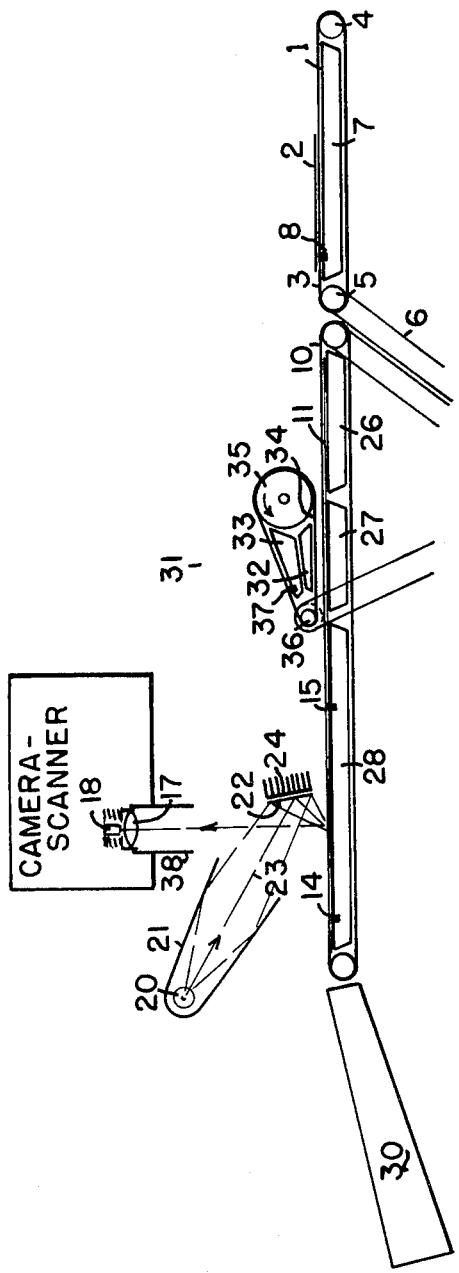
FIG. 1 is a simplified side elevation view of the document video digitizer machine.

In FIG. 1, numeral 1 identifies the feed table, upon which the operator (not shown) places a document 2 for the purpose of converting the text thereof to video signals. The apparatus can be constructed for documents of any size, but a typical document size would be 28. centimeters (cm) by 21.6 cm; i.e. 11"×8½", with a minimum size for the same apparatus of about half this size. The document is preferably placed upon table 1 with a long side parallel to the length of the table, and with the head of the document pointed to the right in FIG. 1.

Figure 3:
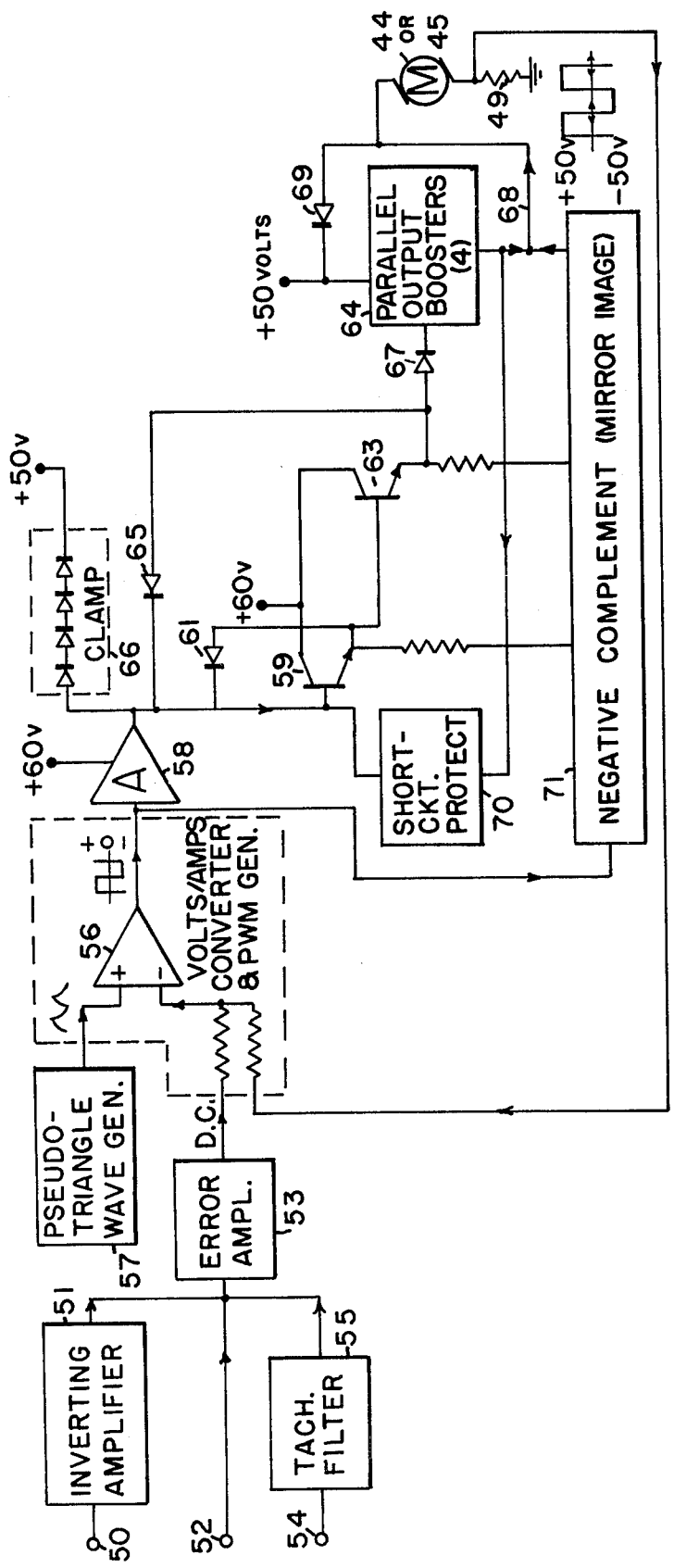
FIG. 3 is a block-schematic diagram of the servo system.

The document is actually placed upon a plurality of spaced belts 3, which overlie the table and are held taut by rollers 4 and 5, the latter being mechanically connected to a motor "M" of FIG. 3 by belt 6. Vacuum chamber 7 lies beneath belts 3.

Figure 2:
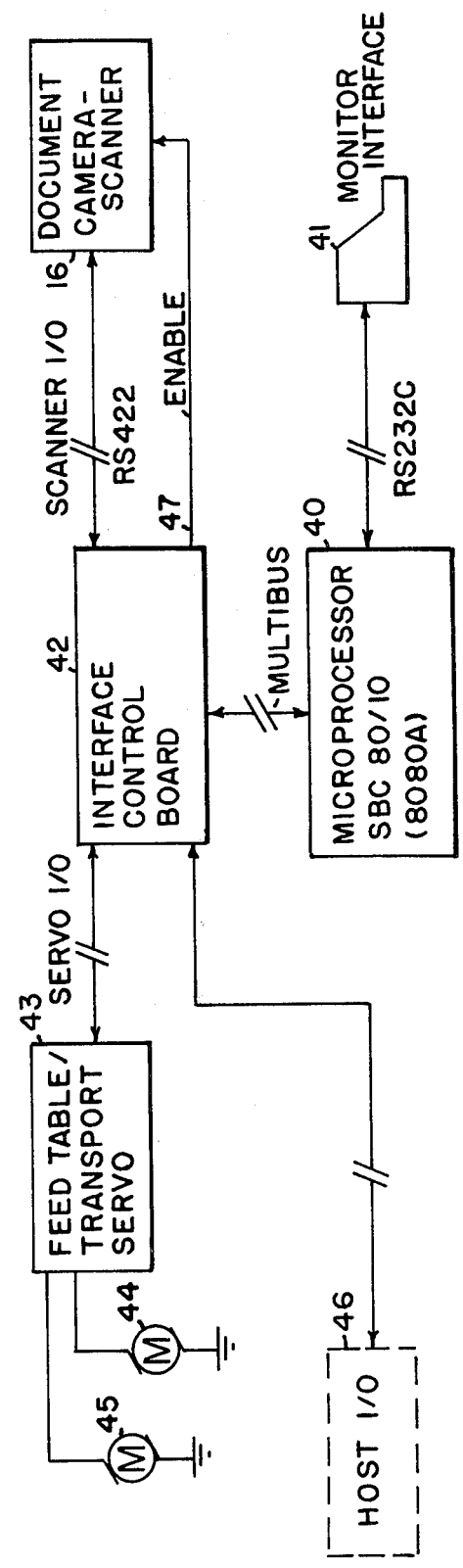
FIG. 2 is a block diagram of the whole electrical system.
Figure 4:
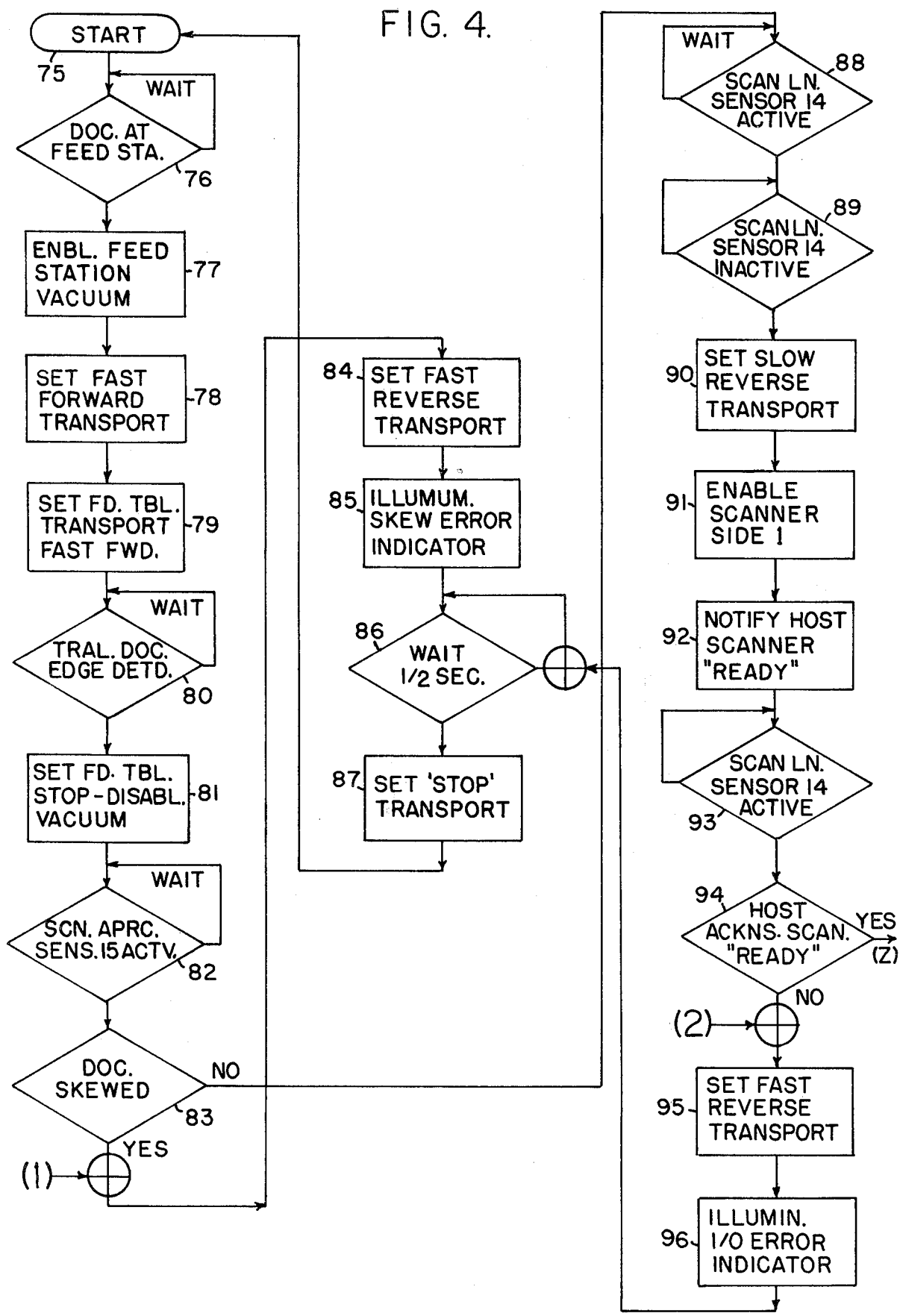
FIG. 4 is the initial part of the flow diagram for the microprocessor of FIG. 2.

When motor M shall be energized and when a vacuum shall be established in chamber 7 is determined by controlling microprocessor 40 of FIG. 2, according to the flow chart of FIG. 4. Accordingly, the functioning of the apparatus will be detailed in the consideration of FIGS. 4 and 5.

Sensor 8 senses that a document is, or is not, at the feed station on table 1. Sensor 8 may be actuated by the stoppage of the air flow through it upon a document being placed over it.

Certain conditions having been met, belts 10 on main table 11 are put in motion, also belts 3 of the feed table.

This results in document 2 being rapidly translated to the left in FIG. 1, say at 254 cm per second.

This continues until sensor 14 is intercepted, which is substantially the whole length of main table 10. On the way, the document passes sensor(s) 15, which detect skew of the document, if any, in a dynamic manner.

Two aligned sensor elements are employed. If the document is not skewed, both elements are influenced at the same time. If the document is skewed, one element might be influenced one millisecond before the other. This time interval corresponds to a large skew, say 15 degrees. Smaller skews are detectable.

When skew is detected the microprocessor controls the table belts to return the document to the operator at feed table 1 for re-positioning correctly and start translating the document to sensor 14 again.

Having reached sensor 14 in good order and giving the "host" I/O 46 of FIG. 2 an opportunity to affirm that video scanning of the document is desired, belts 10 are reversed at a slow speed, say 56 cm/sec., and the scanning takes place. Camera-scanner 16 is electronically activated to accomplish this. The slow motion of the document provides the vertical component of the video scansion, while an elongated multiple light-sensitive element in the camera provides the horizontal component along each (television) line of the scansion. While the term "slow" is used herein, that speed of scanning a document is fast with respect to known art.

It is necessary that the document be illuminated along a narrow transverse area that is imaged by objective lens 17 upon light-sensitive element 18 within the camera.

The preferred embodiment utilizes a high light intensity as a consequence of the reasonably rapid translation of the document at 56 cm/sec and the nominal sensitivity of the light-sensitive element 18. The light intensity is approximately 300,000 Lux, being of uniform intensity across the width of the document and extending about 0.6 cm in the direction of translation.

In order to meet the requirements of this apparatus the optical system has certain unusual characteristics.

Some documents, such as color brochures, have a "shiny" (specular reflective) surface to the paper. Should the optical system direct light vertically down upon such a document only a blank image would be obtained. The light must be directed at approximately 45° to the vertical for the printing and/or other indicia to be properly imaged in the vertical optical path to light-sensitive element 18.

A linear light source 20, such as a quartz-halogen incandescent lamp, approximately 28 cm long and of 1,000 watts rating is situated at one focus of elliptical mirror 21. The other focus is at the document. center ray 23 depicts the optical path from source 20 to plane mirror 22, to the document and then upwards to lens 17. Most of the light illuminating the document is reflected from the sides of elliptical mirror 21.

"Cold" mirror 22 is employed to pass away the infrared radiant energy (heat) from the lamp, and to reflect only the visible energy. This keeps the document and translating belts 10 desirably cool and also prevents spurious optical results from certain inks that are infra-red reflective. The mirror is available in the optical trade.

Light-sensitive element 18 as normally embodied is sensitive to infra-red as well as visible light energy. This is an important reason as to why the infra-red energy must be removed from the light that it receives.

Heat sink 24 is located near behind cold mirror 22 and accepts the infra-red energy. This is manifest as heat and so the several cooling fins are integral with the heat sink. The sink is cooled by a brisk flow of air along the fins, which flow is also directed at lamp 20 for the cooling thereof. This air is provided by a fan-blower and ducts according to known practice and so these have not been shown.

While the document is on main table 11, vacuum chambers 26,27 and 28 are evacuated, as was chamber 7.

By the time the trailing edge of the document has passed sensor 15 on the slow video-signal-generating translation backwards, a switch-manipulated decision previously made by the operator, or handled by a program from the Host I/O 46, determines whether or not the document shall be discharged from the apparatus; shall be turned over and then discharged; or turned over, the second side scanned to produce video signals, and then discharged. Foot switch intervention by the operator may be arranged into the interface control board 42 of FIG. 2; i.e., should the preset program call for only one side scanning, then actuation of the foot switch will arrange for scanning both sides, and vice versa.

Should the choice be to discharge the document after side one is scanned, then belts 10 go into fast forward and the document passes into catch tray 30.

Should the choice be to turn the document over. "flipper" 31 is energized, belts 10 go into fast reverse, the vacuum in chamber 27 is withdrawn and vacuum is established in flipper chambers 32 and 33. In passing underneath the flipper the document is drawn slightly upward by the vacuum in chamber 32 onto plural spaced parallel belts 34, which run on large roller 35 and small roller 36. These rollers are preferably driven by a separate motor that is controlled by microprocessor 40 and its interface circuits.

The document passes around large roller 35 and downward toward small roller 36. Vacuum is re-established in chamber 28 and is withdrawn from chamber 33. This allows the rapidly moving document to leave the flipper mechanism and to again be vacuum-secured to belts 10. The document passes over sensor 37 as it nears roller 36.

If the document is then to be discharged it progresses at high speed to catch tray 30, as before.

If the second side is to be scanned, then belts 10 move forward at slow speed from the time sensor 15 is reached, camera 16 is energized, and the second side is scanned as it moves from sensor 15 to sensor 14. Thereafter, it is moved further forward at high speed into the catch tray.

The video signal thus produced is 180° out of phase with respect to that of side one. An electronic buffer in interface 42 acting as a shift register inverts the data to compensate for this phase reversal.

Camera-scanner 16 is rigidly supported to the rest of the apparatus, in part, by cylindrical tube 38. The distance from the documents on belts 10 and lens 17 may be 55 cm; the lens having a 60 millimeter focal length.

Light-sensitive element 18 is preferably a CCD linear array, such as the Fairchild 143. It is spring mounted against the rear mount of lens 17, so that focus will be maintained. The depth of focus is about 1/10th millimeter.

The several electronic circuits of the camera-scanner; such as timing, electrical clamp, switching for A and B pixels of the CCD, automatic gain centrol of the video signal, gamma correction, aperture correction, and theshold, are according to the Video-scan camera, Model VS2200, of the Terminal Data Corp., Woodland Hills, Calif. Additionally, the circuits and information of the Fairchild 143 CCD instruction manual may be used.

The threshold circuit constitutes the analog to digital converter in the camera-scanner.

In the overall block diagram of the apparatus of FIG. 2, microprocessor 40 is the basic element. It may be a SCB 80/10 board, having an 8080A microprocessor.

An RS232C interface is resident upon the microprocessor circuit board, to which a monitor 41 can be connected for running diagnostic tests, should there be circuit trouble.

Interface control board 42 connects via a multibus to microprocessor 40 and similarly to the other elements of major importance in the apparatus.

An input/output set of connections from control board 42 passes to Feed Table/Transport Servo entity 43. Therefrom are connections to feed table motor 44 and separately to transport table motor 45, for the control of these motors.

At 46, the Host input/output, information to and commands from the "Host", or external microcomputer entity, with which this apparatus is to work in a typical case. This aspect is treated further in the consideration of the flow charts of FIGS. 4 and 5.

Document camera-scanner 16 is connected for input-/output functioning by an RS422 interface; also, an enable scanner connection 47, which puts this device in operating condition when a page of document is to be scanned to produce video signals. At other times the camera is inoperative, since spurious video signals would otherwise be created.

FIG. 3 is a block-schematic diagram of the servo system; block 43 in FIG. 2. There are two separate systems according to FIG. 3; one for activating belts 3 of the feed table by energizing motor 44 of FIG. 2, and another for activating belts 10 of the main transport table by energizing motor 45 of FIG. 2. Both systems are the same; thus, the motor in FIG. 3 is identified as "44 or 45".

Input terminal 50 receives reverse the belts commands, either fast or slow, as the case may be. These pass into inverting amplifier 51 in order to provide the inverse of the forward commands to the error amplifier.

Input terminal 52 receives forward commands, either fast or slow, and is connected directly to error amplifier 53.

Input terminal 54 receives an output from tachometers that are separately connected to each of the belt systems, as the case may be.

The commands from either terminals 50 or 52 are from microprocessor 40 (FIG. 2), are continuously applied as long as a forward or a reverse command is to be executed by the belts involved. The voltage level that represents the command has a constant value and represents the true value for determining the speed of translation of the belts involved.

The input from the tachometer involved, at terminal 54, represents the actual speed of translation of the corresponding belts.

Tachometer filter 55 reduces the speed of response of the system so that high frequency oscillations, as caused by the motor-tachometer coupling resonance, cannot occur.

Error amplifier 53 gives an output corresponding to the difference between the voltage level at either terminal 50 or 52 and that at terminal 54.

The amplitude and the polarity of the output from amplifier 53 gives the remainder of the elements of FIG. 3 electrically represented information as to whether motor 44 or 45 is to rotate faster or slower, forward or reverse.

Amplifier 56, of the differential type, simultaneously performs several functions, according to the designation thereof as "volts to amperes converter and pulse-width modulator generator".

Pseudo-triangle wave generator produces an approximate triangular wave, such as shown by the small waveform adjacent to the output of generator 57. This may be a square wave oscillator, the known triangular wave output of which is utilized. This waveform enters the + terminal of amplifier 56.

The D.C. output from error amplifier 53 enters the − terminal of amplifier 56 through an isolating resistor. Also through an isolating resistor the current sensed as flowing through motor 44 or 45 as a voltage appearing across a small resistance value resistor 49, which is connected between the motor and ground return.

When the motor is running, the error amplifier provides a continuous voltage output as a result of any error developed between the command voltage and the tachometer voltage. This output is then applied to pulse width modulator 56, which adjusts the square-wave duty cycle accordingly. This duty cycle translates into an increase or decrease in current to the motor.

Amplifier 56 and its peripherals thus performs three functions;

(1) converts a D.C. voltage input to motor current output, (2) converts a D.C. voltage to a pulse-width modulated square-wave (along with generator 57), and (3) provides motor current limiting (with resistor 49).

The output of amplifier 56 becomes the input to voltage amplifier 58, and the output thereof passes to the emitter-follower cascade consisting of transistors 59, 63 and 64.

Diodes 61 and 65 are used to speed the transition between "on" and "off" of the subsequent circuits in switching amplifier fashion, thereby reducing the energy loss and consequently reducing the heating of the output circuit semiconductors.

Driver transistor 63 increases the power level to adequately drive parallel output boosters 64, the latter also being properly characterized as a push-pull switching type power amplifier.

The base input of transistor 59 is also connected to a supply voltage, say 50 volts, through a series of similarly poled diodes constituting clamp 66. With this clamp absent, the $V_{ce}$ (voltage across collector to emitter junction) of output booster 64 is 2.6 volts. This gives a power dissipation of 130 watts, with the 50 volt supply. With the clamp present, the voltages in the transistor circuits are adjusted so that the $V_{ce}$ is only 0.25 volt and the dissipation is only 12.5 watts.

Diode 67, inserted at the output emitter of transistor 63 and the input to boosters 64, is a protection diode.

Typically, output boosters 64 is comprised of four power transistors, of the silicon power type. Should one of these fail in use, the failure is invariably a fusion of the collector, emitter and base into one short-circuit conductor. This allows the "+50 volts" power supply for these boosters to revert back to the emitter resistor of driver transistor 63. This destroys the resistor and the heat or fire resulting destroys the circuit board at that location, so that a new circuit board is required as a replacement.

Diode 67 prevents this. In the normal functioning of this part of the circuit diode 67 is forward biased and acts like a conductor. When a booster failure occurs diode 67 is back biased and the circuit is opened. Current flow to the resistor of transistor 63 is thus prevented and there is no damage.

Considering this matter further, it is usual that only one power transistor fails. When this occurs and it becomes a short circuit, this de-energizes the other transistors in parallel therewith, and the other transistors do not fail.

The power output from boosters 64 is connected to motor 44 or 45 by conductor 68. This output may be a current of 50 amperes at a voltage of 50 volts in a preferred embodiment of this apparatus.

Diode 69 allows a fast recovery with respect to current changes by negating the inductance of the motor.

Short circuit protect entity 70 is a transistor that senses too great current in the booster and turns off the drive at transistor 59 under such conditions.

Elongated rectangle 71, labeled "negative complement (mirror image)" is schematic nomenclature for identifying a duplication of all of the elements from 59 through 70 that are shown in FIG. 3.

The square waveform below motor "M" represents a voltage output waveform of +50 volts. That is contributed by the circuit elements 59–70 that are shown in FIG. 3. The voltage of −50 volts is contributed by the negative complement 71. The double-pointed arrows signify that the pulse width may be modulated to increase or decrease the current, as has been described.

Motors 44 and 45 are direct current motors.

In the flow diagram of FIG. 4, "Start", identified by numeral 75, indicates that the apparatus has been turned on and is in operating condition.

The first activity is dependent upon there being a "Document at feed station" 76. Until that occurs the "Wait" return path is taken and the apparatus remains waiting for the document. The document is placed at the feed station by a human operator, or an automatic document feed apparatus.

As soon as the document is present "Enable feed station vacuum" 77 occurs; i.e., in vacuum chamber 7 in FIG. 1.

The next activity is "Set fast forward transport" 78; i.e., belts 10 in fast forward on the main table, FIG. 1. That activity allows acceptance of the document upon the main table once it moves off of the feed table. The next activity is "Set feed table transport in fast forward" 79.

This situation carries on until "Document trailing edge detected" 80 decision point is a "Yes" answer. Prior thereto the instruction is "Wait". The edge is detected by sensor 8.

The document now being on the main transport table the next activity is "Set feed table stop and disable feed station vacuum" 81. This allows the next document to be placed on the feed table by the operator.

"Scan line approach sensor 15 active" 82 decision point is next, with "Wait" until that occurs. When reached, a finding as to whether or not the document is skewed is provided by the pair of sensors at 15.

This finding is accomplished at the next decision point, "Document skewed" 83.

If the answer is "Yes", then the activity is to return the document to the operator.

The first activity thereafter is "Set fast reverse transport" 84; i.e., reverse belts 10 at the fast speed.

The second activity is "Illuminate skew error indicator" 85. This is a lamp upon the control panel of the apparatus that is a part of Interface control board 42 of FIG. 2.

The next activity is "Wait ½ second" 86 decision point, which is interposed to allow the document to return to the operator. Thereafter, "Set 'stop' transport" 87 is activated and the microprocessor returns to the "Start" 75 condition.

The operator is to properly position the document and to start the above-recited sequence over again.

In order to extinguish the skew error indicator lamp the operator must depress the "Reset" button on the control panel. The "Reset" is connected to interface 42 in FIG. 2.

If the skew answer is "No" at decision point 83, then the activity passes on to "Scan line sensor 14 active" 88. If necessary, there is a "Wait" until this occurs; i.e., the time required for the document to move from sensor 15 to sensor 14 at the fast speed of translation. This is a small fraction of a second.

The next activity is "Scan line sensor 14 inactive" 89. This means that the document has gone beyond that sensor, which is to be expected on a fast forward translation of the document. Thereafter, "Set slow reverse transport" 90, becomes active to slowly bring the document back at the slow speed of transport for video scanning. The next activity is to "Enable scanner, side 1" 91; i.e., to activate camera-scanner 16 of FIG. 1.

Next, is to "Notify Host 'scanner ready'" 92; i.e., the apparatus is ready to produce video signals from the document that is in the apparatus. In effect, "Do you wish to have this occur?"

The "Host" is a control microcomputer, minicomputer, or equivalent, that determines overall strategy for the document video digitizer apparatus of this invention, likely in concert with other apparatus that makes use of the digitized video signals. Herein, it is the equivalent to a very fast acting "operator", or agency that establishes what the operative plan shall be.

Next, "Scan line sensor 14 active" 93 decision point holds off video scanning until the answer is given that this should occur.

The next decision point is "Host acknowledges 'scanner ready'" 94. If that answer is "Yes", the document is scanned.

If the answer is "No", the document is returned to the human operator; i.e., "Set fast reverse transport" 95. The "Illuminate I/O error indicator" 96 occurs. After this, the operator must depress the reset switch to extinguish the I/O error lamp.

This return of the document follows the sequence of the prior skew error return. It enters the prior sequence at the beginning of the "Wait ½ second" 86 decision point, then through "Stop" 87 and back to "Start" 75.

Figure 5:
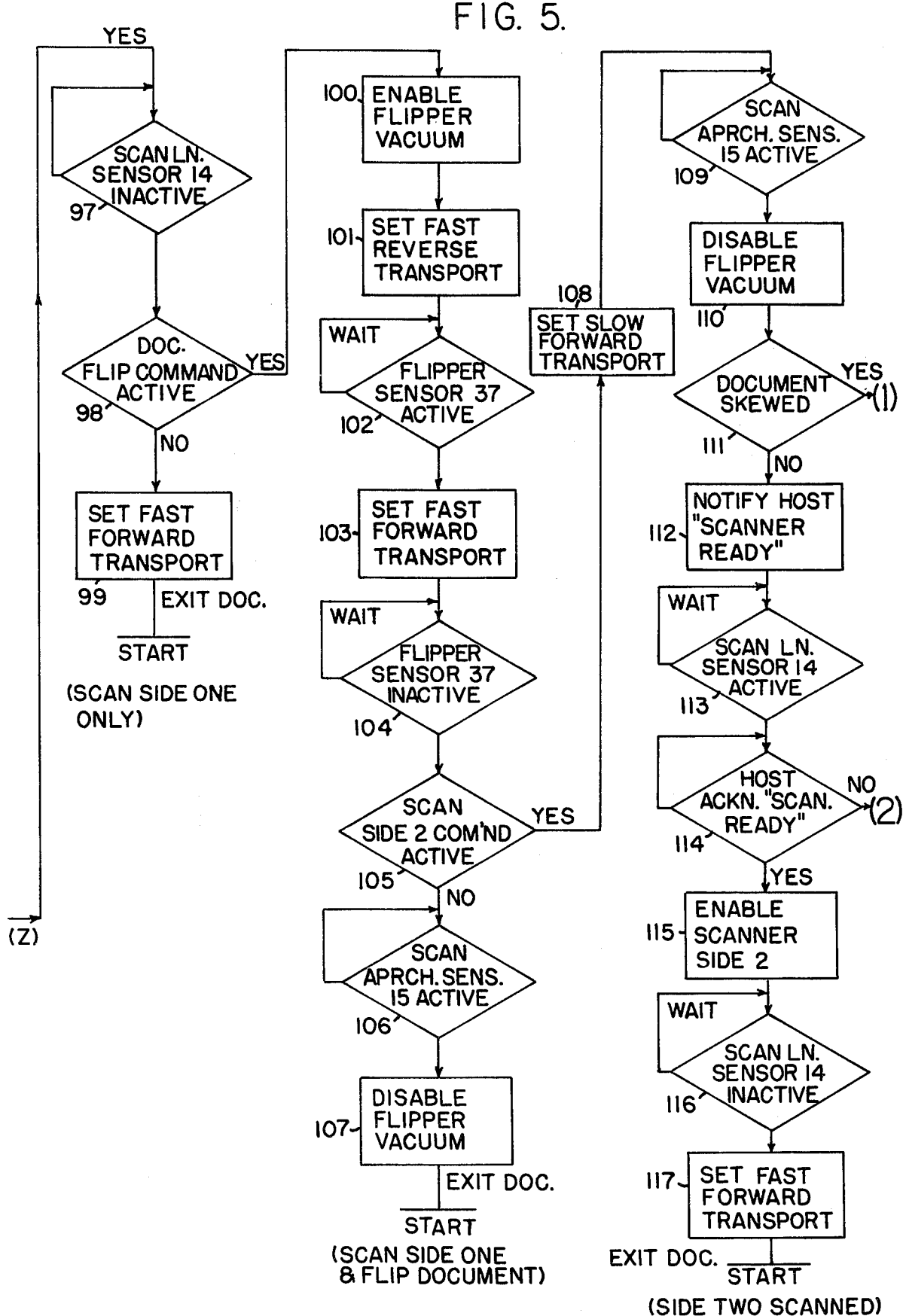
FIG. 5 is the remaining part of the flow diagram for the microprocessor of FIG. 2.

On the other hand, if the "Scanner ready" is acknowledged as "Yes" at 94, the activity goes to the "Yes" of FIG. 5, the remaining part of the flow diagram started in FIG. 4.

Inherent in the "Yes" response at 94 is the empowering of "Set slow reverse transport" 90 and the other preparedness functions of items 91 through 93.

Thus, the document is scanned by camera 16. When this is completed "Scan line sensor 14 inactive" 97 occurs.

At this point a decision is to be made as to whether or not the scanned document is to be turned over.

This is "Document flip command active" 98. If the answer is "No", then the activity is to "Set fast forward transport" 99. This results in the document exiting the apparatus and being deposited in catch tray 30 of FIG. 1. The microprocessor returns to "Start" 75 of FIG. 4.

On the other hand, if the flip command at 98 is "Yes", then the activity is to "Enable flipper vacuum" 100, and after that "Set fast reverse transport" 101. This transports the document under flipper 31. With the flipper vacuum "on" the document adheres to flipper belts 34 and is carried around the flipper to turn the document over. See FIG. 1.

Next, "Flipper sensor 37 active" 102 decision point calls for a "Wait" until this occurs. When it does it signifies that the document is on the opper inclined surface of the flipper.

This calls for activity "Set fast forward transport" 103; i.e., start belts moving rapidly forward.

Again, "Flipper sensor 37 inactive" 104 implies that the document has left the flipper and is largely upon belts 10 of the main transport table.

Next, "Scan side 2 command active" 105 decision point is involved. Typically, this decision has previously been made by the operator manipulating a switch on the control panel. Assume that the answer is "No".

Then "Scan line approach sensor 15 active" 106 decision point is involved, with a "Wait" for the approach to sensor 15.

Thereafter, "Disable flipper vacuum" 107 is accomplished. Since the "Fast forward transport" had been set at 103, the document exists the apparatus to catch tray 30 of FIG. 1 and the microprocessor returns to "Start" 75 of FIG. 4. This routine is employed if some of the documents have been scanned on both sides and it is desired that all of the documents in catch tray 30 lie with corresponding sides upward.

Now, assume that the decision at decision point 105 is "Yes".

Then, with the document just coming off of the flipper belts, the "Set slow forward transport" 108 occurs. After that "Scan line approach sensor 15 active" 109 decision point is reached. There is a "Wait" until that occurs.

Next, "Disable flipper vacuum" 110 occurs so that such vacuum will not confuse the next traverse of the next document in the apparatus.

"Document skewed" 111 decision point is next reached. If the answer is "Yes", then the "(1)" indicates that the action goes back to the same "(1)" after the "Document skewed" 83 decision point of FIG. 4, and the document is returned to "Start" 75, as before.

If the 111 answer is "No", then "Notify Host 'scanner ready'" 112 occurs by action of the microprocessor. Thereafter, "Scan line sensor 14 active" 113 decision point is reached and holds further action until that is true.

The next decision point "Host acknowledges 'scanner ready'" 114, parallels the considerations of items 92 to 94 previously explained.

If the answer at this item 114 is "No", "(2)" indicates that the action goes back to the same "(2)" after item 94 of FIG. 4. The action and the document goes back to "Start" 75, as before.

On the other hand, if the scanner ready is acknowledged as "Yes" at 114, the next activity is "Enable camera-scanner side 2" 115, and the scanning of side 2 takes place at the necessary slow transport speed that had already been set at 108.

Next, "Scan line approach sensor 14 inactive" 116 is involved. The microcomputer waits until this is true, which means that the document has been scanned on side 2.

Thereafter, "Set fast forward transport" 117 occurs, which exits the document to catch tray 30 of FIG. 1.

This concludes scanning the document on two sides, with side 1 being scanned while the document is moving backward at the slow rate and side 2 being scanned while the document is moving forward at the slow rate. This results in both sides of the document being scanned from top to bottom.

The microprocessor goes back to "Start" 75 to be ready to handle the next document.

In addition to the flow chart of FIGS. 4 and 5, there is here presented the architecture relating to microprocessor 40.

The program thereof primarily controls the document transport system. The software handles control of the movement of the documents through the system, including; error warning, position sensing, operator command and diagnostic routines.

The control section of the program resides in the RAM at 3D00H and may not extend beyond the stack, which starts at 4000H and is approximately 32 Bytes long. During power up the program is moved from its origin in the ROM at 0800H to the RAM at 03D00H.

The system utilities reside at 400H, and include port set (.set) and reset (.res) routines, a pause (.delay) routine, and a bipolar status check routine (.newmait).

Bits on the two input (sense) ports stat1 and stat2, are active "low" to the software. Stat1 devotes 5 of its 8 bits to the document position sensors. Bits 2, 3 and 7 are not used. Stat2 uses the low order nibble (4 bits) to describe system conditions and errors. The "hi" order nibble represents the current operator command. Stat3 is not implemented.

The two output (command) ports, com1 and com2, direct system functions. Com1 sends ready, enable and error commands to the system. Com2 directs the motion and speed of the transport and enables the feed table vacuum and motion. Com3 is not used.

Logic polarity is described by the following signal levels. The input ports, stat1 (0E4H) and stat2 (0E5H) are active when low. They will reset hi (1) and become low (0) only in their true (active) state.

The output ports, com1 (0E8H) and com2 (0E9H) are more complex. On the output ports the logic is active when hi. That is, a given command signal, such as flipper .vacuum, rests at a zero or low level. When the program wishes to enable that particular command signal, it is turned on, i.e., hi, (1).

The active hi command port outputs are inverted to active when low on the apparatus side of interface 42 of FIG. 2. Further, all of the individual output command signals, and all of the individual input sense signals, are defined as active hi signals. This is to facilitate readability. The logic still ultimately handles these signals as described above; sense signal logic is active when low and command signal logic is active when hi.

It is seen that coaction of the microprocessor, electrical, optical and mechanical aspects of the apparatus are required for the operation thereof, along with other aspects relating to safety and reliability in order to provide a commercially viable apparatus.

We claim:
1. Document video-manipulative means, comprising;
 (A) video means (16) to accept an image of a document (2),
 (B) belt means (10) to selectively reversibly translate a document,
 (C) servo means (43) to translate said belt means, mechanically connected thereto,
 (D) microprocessor means (40) to control said servo means, electrically connected thereto, to;
  (a) move said document forward at high speed,
  (b) stop said document,
  (c) move said document backward at low speed, and
  (d) activate said video means during the backward motion of said document to form a video signal corresponding to the image of said document.
2. The document video-manipulative means of claim 1, in which said microprocessor means (40) additionally controls said servo means (43) to;
 (a) move said document forward at high speed after the previously recited movements to exit the document from the manipulative means.
3. The document video-manipulative means of claim 1, which additionally includes;
 (A) further belt means (31) having a curvilinear path, thereby to turn said document over, and

(B) said microprocessor means additionally controls said servo means, to;
  (a) move said document backward at high speed, around said further belt means at high speed, and thereafter forward at high speed,
  (b) thereafter move said document forward at low speed,
  (c) activate said video means during the move forward at low speed, to form a video signal corresponding to the image of the second side of said document, and
  (d) move said document forward at high speed to exit the document from the manipulative means.

4. The document video-manipulative means of claim 1, which additionally includes;
  (A) further belt means (31) having a curvilinear path, thereby to turn said document over, and
  (B) said microprocessor means additionally controls said servo means, to;
    (a) move said document backward at high speed, around said further belt means at high speed, and forward at high speed to exit the document from the manipulative means.

5. The document video-manipulative means of claim 1, in which said microprocessor means (40) further includes;
  (a) plural sensors (15) in the path of translation of the document (2) by said belt means (10), said sensors electrically connected to said microprocessor means (40) through interface means (42),
  (b) means in said microprocessor means to detect the time of arrival of an edge of said document at each of said plural sensors, and
  (c) error warning means in said interface means active upon a response from said microprocessor means to respond with an error warning when the time of arrival differs by an interval in excess of that corresponding to a few angular degrees of skew of said document.

6. The document video-manipulative means of claim 1, in which said servo means further includes;
  (a) plural semiconductor means connected in parallel,
  (b) other semiconductor means connected to electrically drive said plural semiconductor means, and
  (c) a diode poled to prevent electrical energy from passing from said plural semiconductor means to said other semiconductor means upon an electrical short occurring in at least one of said plural semiconductor means.

7. The document video-manipulative means of claim 1, in which said servo means (43) further includes;
  (a) means (56,57) to convert a d.c. input from the microprocessor (40) to a pulse-width modulated square wave,
  (b) means (58–64) to convert said pulse-width modulated square wave to motor current output, and
  (c) means (56) to limit the motor current.

8. The document video-manipulative means of claim 7, in which said means (58–64) to convert said pulse-width modulated square wave to motor current output further includes;
  (a) plural series-connected diodes forming a clamp (66) in the circuit from said means (58) to convert said pulse-width modulated square wave to motor current output to a power voltage source (+50 v), to neutralize plural semiconductor voltage drops to significantly reduce the collector to emitter potential drop in a semiconductor element (63) and so the dissipative current thereof.

9. The document video-manipulative means of claim 1, which further includes;
  (a) an elliptical reflector of elongated transverse extent,
  (b) an elongated source of illumination disposed at a focus of said ellipical reflector, and
  (c) a mirror disposed away from said source of illumination to reflect substantially only the visible spectrum emitted by said source of illumination to a relatively narrow area of light transverse of said belt means to illuminate a said document.

10. The document video-manipulative means of claim 1, which further includes;
  (a) a tubular support surmounting said belt means where the belts move at low speed,
  (b) an objective lens having a rear mounting attached to said tubular support away from said belt means, and
  (c) CCD means spring-mounted to press upon said rear mounting to receive an image of said document.

* * * * *